US008426046B2

(12) United States Patent
Christensen et al.

(10) Patent No.: US 8,426,046 B2
(45) Date of Patent: Apr. 23, 2013

(54) LI-ION BATTERY WITH OVER-CHARGE/OVER-DISCHARGE FAILSAFE

(75) Inventors: John F. Christensen, Mountain View, CA (US); Boris Kozinsky, Newton, MA (US); Jasim Ahmed, Mountain View, CA (US); Nalin Chaturvedi, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 908 days.

(21) Appl. No.: 12/437,622

(22) Filed: May 8, 2009

(65) Prior Publication Data
US 2010/0285357 A1 Nov. 11, 2010

(51) Int. Cl.
 *H01M 10/52* (2006.01)
(52) U.S. Cl.
 USPC ............................................................ 429/59
(58) Field of Classification Search ............... 429/57–60
 See application file for complete search history.

(56) References Cited

U.S. PATENT DOCUMENTS

| 6,046,575 | A | 4/2000 | Demuro |
| 6,773,616 | B1 | 8/2004 | Chen et al. |
| 7,029,796 | B2 | 4/2006 | Choi et al. |
| 7,745,057 | B2 * | 6/2010 | Abe et al. ................... 429/330 |
| 2001/0018149 | A1 | 8/2001 | Yageta et al. |
| 2004/0151951 | A1 | 8/2004 | Hyung et al. |
| 2004/0214091 | A1 | 10/2004 | Lim et al. |
| 2004/0242804 | A1 | 12/2004 | Medsker et al. |
| 2006/0154141 | A1 | 7/2006 | Salot et al. |
| 2006/0216603 | A1 | 9/2006 | Choi |
| 2007/0042267 | A1 | 2/2007 | Kim et al. |
| 2007/0202400 | A1 | 8/2007 | Yoshida et al. |
| 2008/0044732 | A1 | 2/2008 | Salot et al. |
| 2008/0058194 | A1 | 3/2008 | Grader et al. |
| 2009/0197184 | A1 | 8/2009 | Kawashima |

FOREIGN PATENT DOCUMENTS

| EP | 0997960 | 5/2000 |
| EP | 1120850 | 8/2001 |
| EP | 1926162 | 5/2008 |
| JP | 6267593 | 9/1994 |
| JP | 10154531 | 6/1998 |

OTHER PUBLICATIONS

International Search Report in corresponding PCT application (i.e., PCT/US2010/034021), mailed Jun. 29, 2010 (3 pages).
Christensen, J. and J. Newman, Effect of anode film resistance on the charge/discharge capacity of a lithium-ion battery. Journal of the Electrochemical Society, 2003. 150(11): p. A1416-A1420.
Christensen, J. and J. Newman, Cyclable Lithium and Capacity Loss in Li-Ion Cells. Journal of the Electrochemical Society, 2005. 152(4): p. A818-A829.
Amatucci, G.G. and N. Pereira, Flouride based electrode materials for advanced energy storage devices. Journal of Flourine Chemistry, 2007. 128(4):p. 243-262.

(Continued)

*Primary Examiner* — Tracy Dove
(74) *Attorney, Agent, or Firm* — Maginot, Moore & Beck

(57) ABSTRACT

An electrochemical cell in one embodiment includes a negative electrode including a form of lithium, a positive electrode spaced apart from the negative electrode, a separator positioned between the negative electrode and the positive electrode, an active material in the positive electrode including a form of lithium, and a gas neutralizing additive.

17 Claims, 2 Drawing Sheets

OTHER PUBLICATIONS

Mikhaylik, Y. Fundamental Chemistry of Sion Power Li/S Battery, in International Battery Association and Hawaii Battery Conference. 2006. Waikoloa, HI.

Wang, J., L. Liu, Z. Ling, J. Yang, C. Wan, and C. Jiang, Polymer lithium cells with sulfur composites as cathode materials. Electrochimica Acta, 2003. 48(13): p. 1861-1867.

Shim, J., K.A. Striebel, and E.J. Cairns, the Lithium/Sulfur Rechargeable Cell. Journal of the Electrochemical Society, 2002. 149: p. A1321.

Doughty, D.H., D.L. Coleman, and M.J. Berry. Abuse Tolerance Studies on Lithium-Sulfur (Li-S) Rechargeable Batteries. In 43rd Power Sources Conference. 2008. Philadelphia, PA.

Schrock, R.R., Catalytic Reduction of Dinitrogen to Ammonia at a Single Molybdenum Center. Accounts of Chemical Research, 2005. 38(12): p. 955-962.

\* cited by examiner

LI-ION BATTERY WITH OVER-CHARGE/OVER-DISCHARGE FAILSAFE

Cross-reference is made to U.S. Utility patent application Ser. No. 12/437,576 entitled "Li-ion Battery with Selective Moderating Material" by John F. Christensen et al., which was filed on May 8, 2009; U.S. Utility patent application Ser. No. 12/437,592 entitled "Li-ion Battery with Blended Electrode" by John F. Christensen et al., which was filed on May 8, 2009; U.S. Utility patent application Ser. No. 12/437,606 entitled "Li-ion Battery with Variable Volume Reservoir" by John F. Christensen et al., which was filed on May 8, 2009; U.S. Utility patent application Ser. No. 12/437,643 entitled "System and Method for Pressure Determination in a Li-ion Battery" by John F. Christensen et al., which was filed on May 8, 2009; U.S. Utility patent application Ser. No. 12/437,745 entitled "Li-ion Battery with Load Leveler" by John F. Christensen et al., which was filed on May 8, 2009; U.S. Utility patent application Ser. No. 12/437,774 entitled "Li-ion Battery with Anode Coating" by John F. Christensen et al., which was filed on May 8, 2009; U.S. Utility patent application Ser. No. 12/437,791 entitled "Li-ion Battery with Anode Expansion Area" by Boris Kozinsky et al., which was filed on May 8, 2009; U.S. Utility patent application Ser. No. 12/437,822 entitled "Li-ion Battery with Porous Anode" by Boris Kozinsky et al., which was filed on May 8, 2009; U.S. Utility patent application Ser. No. 12/437,873 entitled "Li-ion Battery with Porous Anode Support" by Boris Kozinsky et al., which was filed on May 8, 2009; U.S. Utility patent application Ser. No. 12/463,024 entitled "System and Method for Charging and Discharging a Li-ion Battery" by Nalin Chaturvedi et al., which was filed on May 8, 2009; and U.S. Utility patent application Ser. No. 12/463,092 entitled "System and Method for Charging and Discharging a Li-ion Battery Pack" by Nalin Chaturvedi et al., which was filed on May 8, 2009, the entirety of each of which is incorporated herein by reference. The principles of the present invention may be combined with features disclosed in those patent applications.

FIELD OF THE INVENTION

This invention relates to batteries and more particularly to lithium-ion batteries.

BACKGROUND

Batteries are a useful source of stored energy that can be incorporated into a number of systems. Rechargeable lithium-ion batteries are attractive energy storage systems for portable electronics and electric and hybrid-electric vehicles because of their high specific energy compared to other electrochemical energy storage devices. In particular, batteries with a form of lithium metal incorporated into the negative electrode afford exceptionally high specific energy (in Wh/kg) and energy density (in Wh/L) compared to batteries with conventional carbonaceous negative electrodes.

When high-specific-capacity negative electrodes such as lithium are used in a battery, the maximum benefit of the capacity increase over conventional systems is realized when a high-capacity positive electrode active material is also used. Conventional lithium-intercalating oxides (e.g., $LiCoO_2$, $LiNi_{0.8}Co_{0.15}Al_{0.05}O_2$, $Li_{1.1}Ni_{0.3}Co_{0.3}Mn_{0.3}O_2$) are typically limited to a theoretical capacity of ~280 mAh/g (based on the mass of the lithiated oxide) and a practical capacity of 180 to 250 mAh/g. In comparison, the specific capacity of lithium metal is about 3863 mAh/g. The highest theoretical capacity achievable for a lithium-ion positive electrode is 1168 mAh/g (based on the mass of the lithiated material), which is shared by $Li_2S$ and $Li_2O_2$. Other high-capacity materials including $BiF_3$ (303 mAh/g, lithiated) and $FeF_3$ (712 mAh/g, lithiated) are identified in Amatucci, G. G. and N. Pereira, *Fluoride based electrode materials for advanced energy storage devices*. Journal of Fluorine Chemistry, 2007. 128(4): p. 243-262. All of the foregoing materials, however, react with lithium at a lower voltage compared to conventional oxide positive electrodes, hence limiting the theoretical specific energy. The theoretical specific energies of the foregoing materials, however, are very high (>800 Wh/kg, compared to a maximum of ~500 Wh/kg for a cell with lithium negative and conventional oxide positive electrodes).

Lithium/sulfur (Li/S) batteries are particularly attractive because of the balance between high specific energy (i.e., >350 Wh/kg has been demonstrated), rate capability, and cycle life (>50 cycles). Only lithium/air batteries have a higher theoretical specific energy. Lithium/air batteries, however, have very limited rechargeability and are still considered primary batteries.

One significant consideration in the incorporation of lithium-ion battery cells into a particular application is the manner in which lithium-ion battery cells react to overcharging and over-discharging conditions. Over-discharging a lithium ion battery cell can irreversibly damage the cell and significantly shorten its cycle life. Likewise, charging a lithium ion battery cell above a particular cutoff voltage, which is dependent upon the particular chemistry, can shorten the cycle life of the cell.

Specifically, overcharge or over-discharge of lithium-ion battery cells may result in the generation of $H_2$, $N_2$, and other gases depending upon cell chemistry. When a pouch or other flexible form of cell packaging is used for the battery, this gas generation may lead to a swelling of the battery, which can result in disconnection of cell layers and, in extreme cases, venting of the battery. Venting of gases may present a serious safety concern.

Various approaches have been developed to guard against overcharge or over-discharge of lithium-ion battery cells. By way of example, U.S. Pat. No. 6,046,575, issued on Apr. 4, 2000, is directed to a circuit designed to prevent overcharge or over-discharge of lithium-ion battery cells. Battery control circuits, however, can become disabled, particularly when the associated battery is located on a vehicle that has been involved in an accident.

What is needed therefore is a battery that exhibits a reduced reliance on external circuits to protect against venting of a lithium-ion battery cell as a result of overcharge or over-discharge.

SUMMARY

In accordance with one embodiment, an electrochemical cell includes a negative electrode including a form of lithium, a positive electrode spaced apart from the negative electrode, a separator positioned between the negative electrode and the positive electrode, an active material in the positive electrode including a form of lithium, and a gas neutralizing additive.

In accordance with another embodiment, an electrochemical cell includes a negative electrode including a first form of lithium, a positive electrode spaced apart from the negative electrode, the positive electrode including a second form of lithium, a separator positioned between the negative electrode and the positive electrode, and a gas neutralizing additive.

DESCRIPTION

Figure 1:
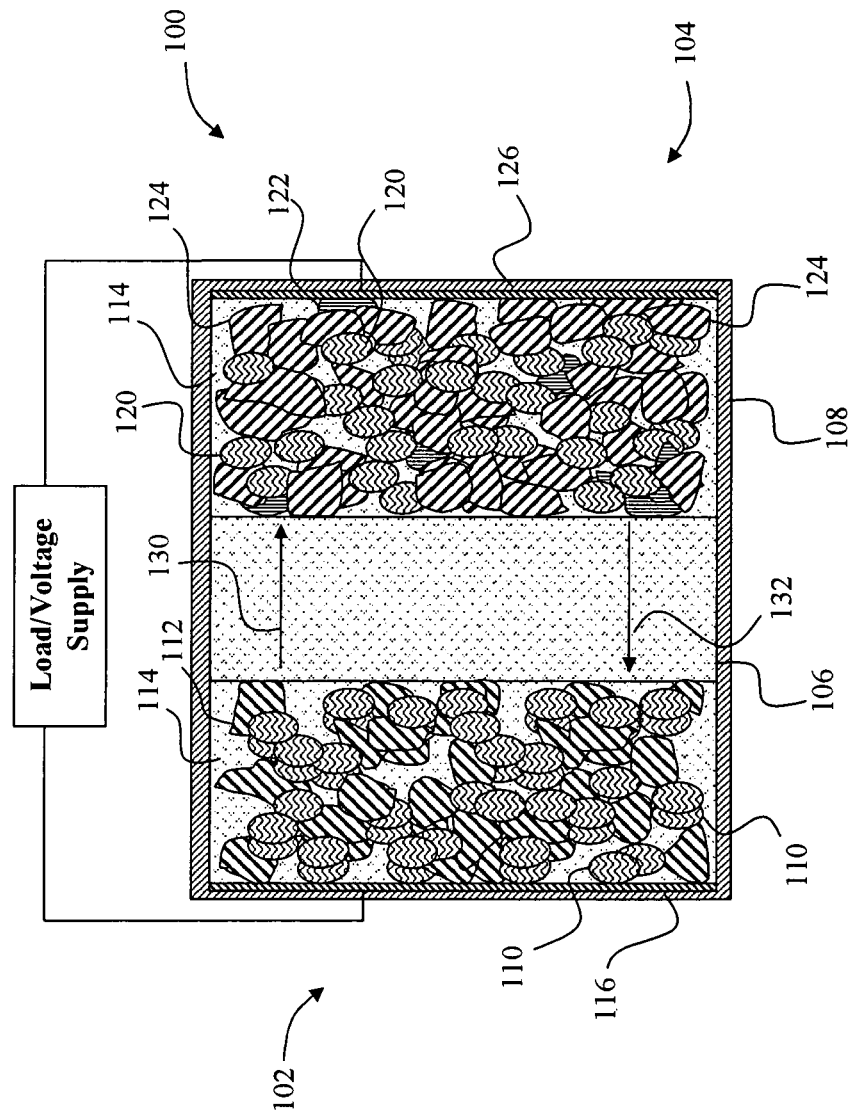
FIG. 1 depicts a schematic of an electrochemical cell with one electrode including a form of lithium and another electrode including an active material with a form of lithium and a gas neutralizing material.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

FIG. 1 depicts a lithium-ion cell 100, which includes a negative electrode 102, a positive electrode 104, and a separator region 106 between the negative electrode 102 and the positive electrode 104. The negative electrode 102, positive electrode 104, and separator region 106 are contained within a pouch 108. The negative electrode 102 includes active materials 110 into which lithium can be inserted, inert materials 112, electrolyte 114 and a current collector 116.

The negative electrode 102 may be provided in various alternative forms. The negative electrode 102 may incorporate dense Li metal or a conventional porous composite electrode (e.g., graphite particles mixed with binder). Incorporation of Li metal is desired since the Li metal affords a higher specific energy than graphite.

The separator region 106 includes an electrolyte with a lithium cation and serves as a physical and electrical barrier between the negative electrode 102 and the positive electrode 104 so that the electrodes are not electronically connected within the cell 100 while allowing transfer of lithium ions between the negative electrode 102 and the positive electrode 104.

The positive electrode 104 includes active material 120 into which lithium can be inserted, gas neutralizing material 122, inert materials 124, the electrolyte 114 and a current collector 126. The active material 120 may include a form of sulfur and may be entirely sulfur. The active material 120 may incorporate a form of lithium such as lithium oxide or $Li_{4+x}Ti_5O_{12}$.

A "gas neutralizing" material as that term is used herein means a material or additive that includes an electron withdrawing group or which catalyzes the reduction of a gas. The gas neutralizing material 122 may be a material which reacts, for example, with $H_2$, and/or $N_2$, and/or other gases formed during overcharge or over-discharge of the cell 100. The gas neutralizing material 122 may be a cyclic carbonate with a halogenated, —CN, —NO_2, or other electron withdrawing group, or some other compound that contains an electron withdrawing group. Alternatively, the additive may be a catalyst that catalyzes the reduction of nitrogen to ammonia. The gas neutralizing material 122 thus ameliorates one or more deleterious conditions presented by the targeted gas such as increased pressure or volatility.

Under moderate power demands, the lithium-ion cell 100 operates in a manner similar to the lithium-ion battery cell disclosed in U.S. patent application Ser. No. 11/477,404, filed on Jun. 28, 2006, the contents of which are herein incorporated in their entirety by reference. In general, electrons are generated at the negative electrode 102 during discharging and an equal amount of electrons are consumed at the positive electrode 104 as lithium and electrons move in the direction of the arrow 130 of FIG. 1.

In the ideal discharging of the cell 100, the electrons are generated at the negative electrode 102 because there is extraction via oxidation of lithium ions from the active material 110 of the negative electrode 102, and the electrons are consumed at the positive electrode 104 because there is reduction of lithium ions into the active material 120 of the positive electrode 104. During discharging, the reactions are reversed, with lithium and electrons moving in the direction of the arrow 132.

In various applications, however, the cell 100 may be subjected to over-discharge or overcharging. Such conditions result in the generation of gases including $H_2$, $N_2$, and potentially other gases. As the gases are generated, the gases migrate through the cell 100 and come in contact with the gas neutralizing material 122. The gas neutralizing material 122 reacts with the gas to neutralize the gas so as to reduce the pressure effects of the gas and/or to reduce the volatility of the gas. By way of example, a gas neutralizing material 122 provided to neutralize the effects of $N_2$ may catalyze the reduction of $N_2$ into ammonia. One such catalyst material is described by Schrock, R. R., *Catalytic Reduction of Dinitrogen to Ammonia at a Single Molybdenum Center*, Accounts of Chemical Research, 2005. 38(12): p. 955-962.

If desired, multiple types of a gas neutralizing material 122 may be incorporated into the cell 100 to neutralize the effects of different types of gases. Additionally, the gas neutralizing material 122 may be incorporated into the cell 100 in various alternative embodiments. In one embodiment, the gas neutralizing material 122 is incorporated in the separator 106, the negative electrode 102, or in the electrolyte 114.

Figure 2:
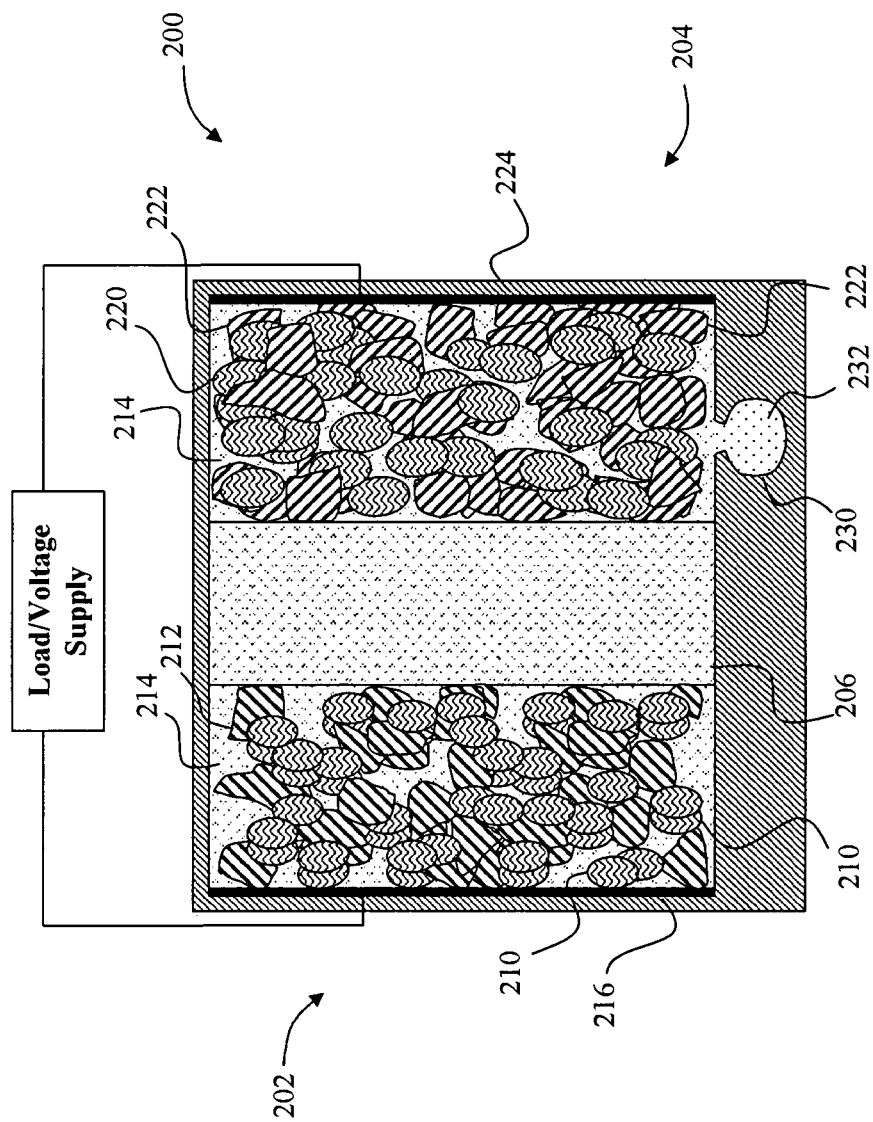
FIG. 2 depicts an alternative embodiment of an electrochemical cell with a separate compartment housing a gas neutralizing material.

The location or locations of the gas neutralizing material in different embodiments may vary according to the particular battery application. FIG. 2 shows one such alternative embodiment. The lithium-ion cell 200 of FIG. 2 includes a negative electrode 202, a positive electrode 204, and a separator region 206 between the negative electrode 202 and the positive electrode 204. The negative electrode 202, positive electrode 1204, and separator region 206 are contained within a pouch 208. The negative electrode 102 includes active materials 210 into which lithium can be inserted, inert materials 212, electrolyte 214 and a current collector 216.

The positive electrode 204 includes active material 220 into which lithium can be inserted, inert materials 222, the electrolyte 214 and a current collector 224. The active material 220 may include a form of sulfur and may be entirely sulfur. The active material 220 may incorporate a form of lithium such as lithium oxide or $Li_{4+x}Ti_5O_{12}$.

The negative electrode 202 and the separator region 206 may be substantially the same as the electrode 102 and the separator region 106. The positive electrode 204, however, does not include a gas neutralizing material. Rather, the cell 200 includes a separate compartment 230 located at an elevated portion of the cell 200 which includes a gas neutralizing material 232. The electrolyte 114 is in fluid communication with the compartment 230. In further embodiments, a fluid trap or other device may be provided to minimize reintroduction of neutralization byproducts into the electrodes. The optimal configuration will depend upon the neutralizing reaction.

The cell 200 operates in a manner similar to the cell 100. One difference is that when a gas is generated, the gas migrates through the electrolyte 114 to the compartment 230 where the gas reacts with the gas neutralizing material 232.

The configuration of FIG. 2 may be particularly beneficial in applications such as a vehicle battery in which the battery orientation generally does not change. Accordingly, the compartment 230 can be positioned at an elevated portion of the cell 200 to which gases would normally percolate.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. An electrochemical cell, comprising:
   a negative electrode including a form of lithium;
   a positive electrode spaced apart from the negative electrode;
   a separator positioned between the negative electrode and the positive electrode;
   an active material in the positive electrode including a form of lithium; and
   at least one gas neutralizing additive, wherein the at least one gas neutralizing additive comprises a catalyst that catalyzes the reduction of nitrogen to ammonia.

2. The electrochemical cell of claim 1, wherein the at least one gas neutralizing additive is located within the positive electrode.

3. The electrochemical cell of claim 2, wherein the at least one gas neutralizing additive is located within an electrolyte in the positive electrode.

4. The electrochemical cell of claim 1, wherein the at least one gas neutralizing additive is located within the negative electrode.

5. The electrochemical cell of claim 1, wherein the at least one gas neutralizing additive is located within the separator.

6. An electrochemical cell, comprising:
   a negative electrode including a form of lithium;
   a positive electrode spaced apart from the negative electrode;
   a separator positioned between the negative electrode and the positive electrode;
   an active material in the positive electrode including a form of lithium;
   at least one gas neutralizing additive; and
   a compartment in fluid communication with one or more components selected from a group of components consisting of the negative electrode, the separator, and the positive electrode, wherein the at least one gas neutralizing additive is located within the compartment.

7. The electrochemical cell of claim 6 wherein the at least one gas neutralizing additive comprises an electron withdrawing group.

8. The electrochemical cell of claim 7, wherein the at least one gas neutralizing additive comprises a cyclic carbonate.

9. An electrochemical cell, comprising:
   a negative electrode including a first form of lithium;
   a positive electrode spaced apart from the negative electrode, the positive electrode including a second form of lithium, wherein the second form of lithium comprises Li/S;
   a separator positioned between the negative electrode and the positive electrode;
   at least one gas neutralizing additive; and
   a compartment in fluid communication with one or more components selected from a group of components consisting of the negative electrode, the separator, and the positive electrode, wherein the at least one gas neutralizing additive is located within the compartment.

10. The electrochemical cell of claim 9, wherein the first form of lithium comprises a lithium oxide.

11. The electrochemical cell of claim 9 wherein the at least one gas neutralizing additive comprises an electron withdrawing group.

12. The electrochemical cell of claim 11, wherein the at least one gas neutralizing additive comprises a cyclic carbonate.

13. The electrochemical cell of claim 9, wherein the at least one gas neutralizing additive comprises a catalyst that catalyzes the reduction of nitrogen to ammonia.

14. The electrochemical cell of claim 7, wherein the at least one gas neutralizing additive comprises a catalyst that catalyzes the reduction of nitrogen to ammonia.

15. The electrochemical cell of claim 12, wherein the at least one gas neutralizing additive comprises a catalyst that catalyzes the reduction of nitrogen to ammonia.

16. The electrochemical cell of claim 6, wherein the at least one gas neutralizing additive comprises a catalyst that catalyzes the reduction of nitrogen to ammonia.

17. The electrochemical cell of claim 16, wherein the at least one gas neutralizing additive comprises a cyclic carbonate.

\* \* \* \* \*